United States Patent
Shinogi

[11] Patent Number: 6,114,815
[45] Date of Patent: Sep. 5, 2000

[54] DEVICE AND PROCESS FOR LIGHTING DISCHARGE LAMP

[75] Inventor: Akira Shinogi, Chofu, Japan

[73] Assignee: ORC Manufacturing Co., Ltd., Tokyo, Japan

[21] Appl. No.: 09/344,364

[22] Filed: Jun. 25, 1999

[30] Foreign Application Priority Data

Jun. 25, 1998 [JP] Japan .................................. 10-178744
Jun. 25, 1998 [JP] Japan .................................. 10-178745

[51] Int. Cl.⁷ .................................................. H05B 37/00
[52] U.S. Cl. .......................... 315/290; 315/278; 315/224; 315/209 R; 315/246; 315/DIG. 5
[58] Field of Search .................................. 315/289, 290, 315/276, 278, 219, 209 R, 205, 246, 224, DIG. 5, DIG. 7

[56] References Cited

U.S. PATENT DOCUMENTS

| | | | |
|---|---|---|---|
| 5,173,643 | 12/1992 | Sullivan et al. | 315/276 |
| 5,434,474 | 7/1995 | Ukita et al. | 315/128 |
| 5,491,386 | 2/1996 | Eriguchi et al. | 315/209 R |
| 5,502,423 | 3/1996 | Okude et al. | 315/291 |
| 5,606,227 | 2/1997 | Yamamoto et al. | 315/289 |

FOREIGN PATENT DOCUMENTS

| | | |
|---|---|---|
| 63-244589 | 10/1988 | Japan . |
| 63-244590 | 10/1988 | Japan . |
| 1-159396 | 11/1989 | Japan . |
| 2-29200 | 2/1996 | Japan . |
| 2705010 | 10/1997 | Japan . |
| 2705018 | 10/1997 | Japan . |

*Primary Examiner*—Haissa Philogene
*Attorney, Agent, or Firm*—Liniak, Berenato, Longacre & White

[57] ABSTRACT

A device for lighting a discharge lamp comprises a rectifier, a switching circuit having a semiconductor element to be connected to said rectifier; a direct power supplying circuit having a rectifying circuit and filtering circuit each connected to said switching circuit; and a discharge lamp and a starter which are connected after said filtering circuit; said starter having a transformer and a smoothing capacitor for generating a high voltage is provided, which has a circuit having a switching element and a resistance connected in series provided between the smoothing capacitor and said discharge lamp and further has a second capacitor connected parallel to said discharge lamp.

7 Claims, 9 Drawing Sheets

DEVICE AND PROCESS FOR LIGHTING DISCHARGE LAMP

FIELD OF THE INVENTION

The present invention relates to a device and a process for lighting a discharge lamp for a light treatment and particularly to a device and a process for lighting a discharge lamp which can conduct an appropriate action at the initial stage.

BACKGROUND OF THE INVENTION

Generally speaking, in the field of direct current discharge lamps for use in a light treatment such as, of forming an electric circuit onto a semiconductor or onto a printed board, various devices have been suggested for making a series of actions from lighting of the discharge lamp up to stable running of the discharge lamp smooth. As a typical example of such a type of discharge lamp, a so-called short arc type discharge lamp whose distance between electrodes is several mm will be described.

When started, the short arc type discharge lamp causes dielectric breakdown of a sealed gas to reach an arc discharge via a glow discharge, and then stabilizes the arc discharge so as to ensure stable lighting of the discharge lamp. FIG. 9A shows the curves showing the conditions that the voltage and current are changed from the dielectric breakdown to the state of retaining the arc discharge.

As shown in FIG. 9A by an arrow (11) (see curve A), the sealed gas such as mercury or xenon is ionized by the application high voltage, typically of 1000° C. or more, to the electrodes of the discharge lamp to generate an electrically conductive gas. This phenomenon is called "dielectric breakdown". Subsequent continuous application of a voltage over several hundreds volt to the electrodes causes the collision of the electrons with the atoms in the ionized, electrically conductive gas, leading to the further progress of the ionization. This results in the retaining of the discharge (see arrow (12)). The electrons taking part in the ionization are those discharged from the atoms, as a result of the dielectric breakdown of the gas. The state that the discharge is continued is called "glow discharge". In this case, the voltage between the electrodes at which the discharge is generated is generally from approximately 90 to 120 V, and the current run between these electrodes is not more than several hundreds mA.

When the current run continuously through the gas in the glow discharge state, due to the electrode being heated by the electron collision, the amount of electrons thermally discharged from the electrode and, at the same time, the ionization of the sealed gas is promoted to become a conducting state. This state is called "arc discharge" (see arrow (13)). In this state, the voltage to flow between the electrodes are generally from 20 to 60 V, and it becomes easier for the current of from several A to several hundreds A between the electrodes.

As devices for lighting such a discharge lamp, various types of the devices have been suggested. For examples, there exist a lighting device comprising a resistor so-called leakage resistor capable of regulating the current at the time of shorting the load, and a switch mode lighting device utilizing semiconductor elements, and a lighting device which utilizes a starter for causing the dielectric breakdown of the sealed gas within the discharge lamp to cause the glow discharge and the arc discharge.

The starter of the lighting device is composed of a direct current high voltage generating circuits, which arranged on the discharge lamp in parallel and, at the same time, diode connected between the main power circuit and the discharge lamp not so as to apply a high voltage to the direct current main power circuit for maintaining the arc discharge.

The starter for the discharge lamp may be on which can generate a voltage of not less than 1000 V, which is required for the dielectric breakdown of the sealed gas, and which can supply a current enough for starting the arc discharge. The main power may be one which can supply a current and a voltage enough for maintaining the arc discharge as shown on the curve d of FIG. 9A. In this context, the output current and power characteristics of the starter should be those shown as the dot line b of FIG. 9A.

However, since it is required to generate a high voltage enough for the dielectric breakdown, the starter utilizes a transformer having a high boosting ratio. For this reason, the starter can only supply a faint current and, thus, the output voltage and current characteristics of the discharge lamp results in a double broken line b of FIG. 9A. Consequently, the dielectric breakdown of the sealed gas can be caused, but it becomes sometimes impossible to maintain the glow discharge state and to make transition transferred to the arc discharge.

In order to solve such a problem, a device for lighting a discharge lamp has been disclosed in which a smoothing capacitor for rectification having a large capacity so that electric charge collected in the capacitor are instantly run through the discharged lamp at the time of starting the discharge, and by the virtue of the large amount of the electric current at this time, the state is shifted to the arc discharged state (see Japanese Patent No. 2705010 and Japanese Patent No. 2705018).

However, even if the devices are made as described above, there sometimes causes the dielectric breakdown at a relatively low voltage of approximately 500 V due to an influence of a temperature, etc., upon the discharge lamp. In such a case, since the voltage, charged in the smoothing capacitor, is as low as 500 V, it becomes impossible to make transition into the arc discharge. In order to solve such a problem, a method has been suggested in which a switching element such as an arrester, which conducts when the voltage reaches a prescribed level such as 1000 V, is connected between the smoothing capacitor and the discharge lamp. This method is applied to the construction of the circuit well known as relaxation oscillation circuit utilizing a non-linear switching element such as diode AC switch (DIAC).

However, the conventional devices for lighting a discharge lamp have the following problems:

(1) In the case of using a relaxation oscillation circuit, the switching element becomes conductive at the first time when the voltage becomes high so that the energy of the smoothing capacitor can be instantly supplied to the discharge lamp. For this reason, the voltage and the electric current applied to the discharge lamp are very rapidly changed in comparison with the normal relaxation oscillation circuit. The wave form thereof includes portions at which big oscillation occurs as shown in FIG. 9B. This causes radio frequency interference to malfunction of power circuit.

(2) In this context, it has been carried out that an inductance element is inserted into the discharge lamp in series to relax the oscillation current. However, due to relatively high inductance required, any closed magnetic circuit cannot be used for preventing magnetic saturation against a large amount of current, which runs instantly, and thus, the inductance element used must be very large size, inducing the problem in terms of heavy weight.

(3) As for the starting method utilizing a smoothing capacitor and discharge, due to very large current running from the smoothing capacitor to the discharge lamp becomes very large (although the period thereof is short), the sputtering of electrode is caused, making the service life markedly short.

(4) When the power source connected to the discharge lamp, which can supply the voltage and the current required for maintaining the glow discharge and the arc discharge, is used, it is possible to be shifted into the arc discharge state immediately after the dielectric breakdown of the sealed gas. For maintaining the glow discharge state, although a voltage required is 1000 V or more, the current required may be of relatively small amount. On the other hand, in order to maintain the arc discharge state, the voltage required is only 60 V, but a current in an amount of 1 A or more should be required, and in some cases, a power source which can run a current exceeding 100 A is required. Consequently, if single power circuit is used for maintaining both the glow discharge and the arc discharge, due to large heat loss in the power circuit in the state of the arc discharge, the power source having unduly large capacity must be used.

(5) In the case where the discharge lamp cannot be turned on, for example, under the influence of a temperature, the dielectric breakdown at a lower voltage occurs, and then the discharge lamp cannot be shifted into the glow discharge, or in the case when the turn on is tried soon after the turn off of the lamp, it is again turned on, there is a disadvantage that the starter is not restarted until the voltage applied to the discharge lamp is very high.

SUMMARY OF THE INVENTION

The present invention has been made in order to solve the problems mentioned previously and an object of the present invention is to provide a device for lighting a discharge lamp which does not generate radio wave disorder according to rapid change in the electric current and voltage, which can reduce its weight and which is capable of suppressing the cause of sputtering electrodes as little as possible.

Another object of the present invention is to provide a process for lighting a discharge lamp excelling in the working of re-lighting.

A first aspect of the present invention concerns a device for lighting a discharge lamp comprising a rectifier, a switching circuit having a semiconductor element to be connected to said rectifier; a direct power supplying circuit having a rectifying circuit and filtering circuit each connected to said switching circuit; and a discharge lamp and a starter which are connected after said filtering circuit; said starter having a transformer and a smoothing capacitor for generating a high voltage; and said device having a circuit having a switching element and a resistance connected in series provided between the smoothing capacitor and said discharge lamp and further having a second capacitor connected parallel to said discharge lamp.

In this device, it is preferred that said switching element supplies a voltage to said discharge lamp in such a manner that the voltage set until the conditions for causing the dielectric break down of the sealed gas of the discharge lamp are ready.

Further, in this device, it is preferred that said second capacitor has a capacity smaller than that of said smoothing capacitor.

A second aspect of the present invention concerns a device for lighting a discharge lamp comprising a switching circuit having a semiconductor, transformers connected one by one to said switching circuit, a rectifying circuit connected to said resistors, a filtering circuit connected to said rectifying circuit, a discharge lamp connected after the rectifying circuit and a starter for starting said discharge lamp; said transformers having a primary winding for supplying main current to a secondary winding and at the same time having second auxiliary windings, and supplying a direct voltage obtainable from a rectifying circuit connected to said second auxiliary windings to the main voltage supplying circuit via a starting switching circuit until the discharge lamp is stably lightened.

In this device, it is preferred that said starter possesses a smoothing capacitor for generating a high voltage, and a circuit having a switching element and a resistor connected in series, former capacitor is conductive at a voltage higher than a prescribed level, and said starter is connected to said discharge lamp in series.

Also, in this device, it is preferred that said starting switching circuit possesses a circuit for discriminating discharge, one end of which circuit is connected to a current-voltage detecting circuit and, at the same time, a working portion which decides "ON" or "OFF" of said starting switching circuit, according to the output from said circuit for discriminating discharge.

A third aspect of the present invention concerns a process lighting a discharge lamp comprising: supplying to a discharge lamp, a high voltage for dielectric breakdown from a starter and, at same time, a high voltage for dielectric breakdown, which is lower than the former voltage, from an auxiliary winding provided on a transformer to cause dielectric breakdown to thereby cause a glow discharge between the electrodes of the discharge lamp, whereby a current runs between the electrode to stop the starter, and when the conditions of arc discharge are satisfied and the amount of the current becomes more than a prescribed set value, supplying a current from a main power circuit to the discharge lamp to lighten the discharge lamp, the process further comprising the following step: supplying, after stopping the starter, an additional high voltage for discharge from auxiliary winding to shift the glow discharge into the arc discharge, and then breaking the voltage therefrom.

DESCRIPTION OF THE PREFERRED EMBODIMENTS

The first embodiment of the present invention will now be described with reference to the accompanying drawings.

(1) First Embodiment

Figure 1:
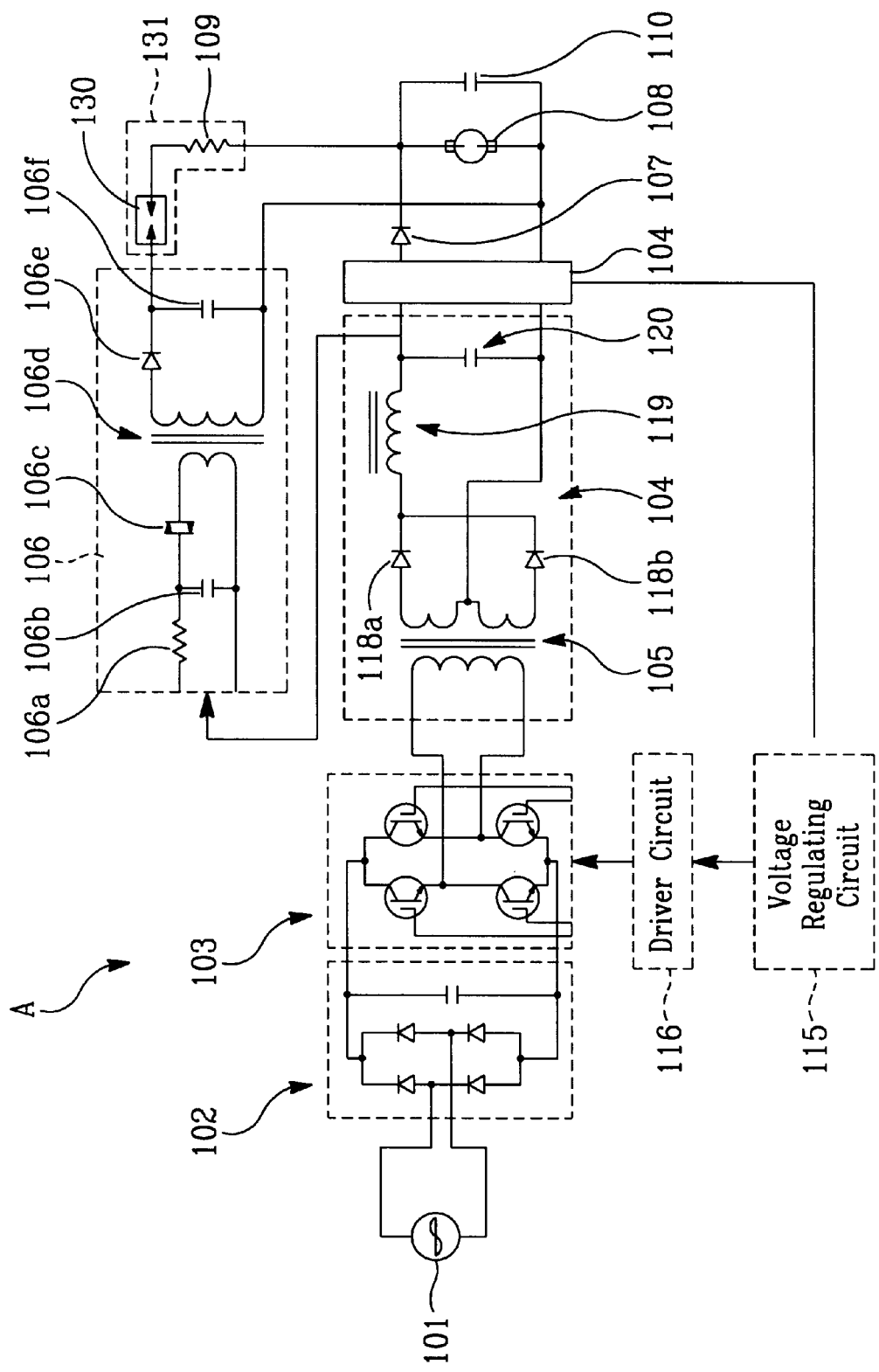
FIG. 1 is a circuit diagram totally showing the device for a discharge lamp according to one embodiment of the present invention.
Figure 2:
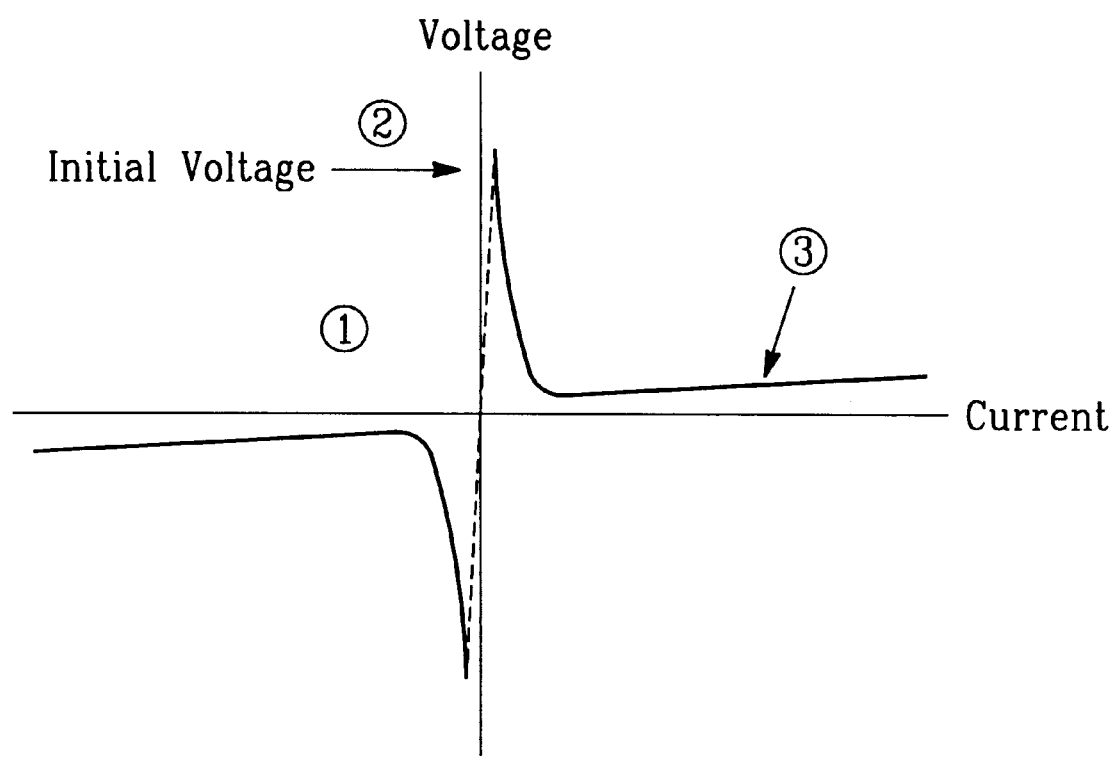
FIG. 2 is a graph showing the voltage-current characteristics of the switching element of the device for lighting a discharge lamp according to the present invention.
Figure 3A:
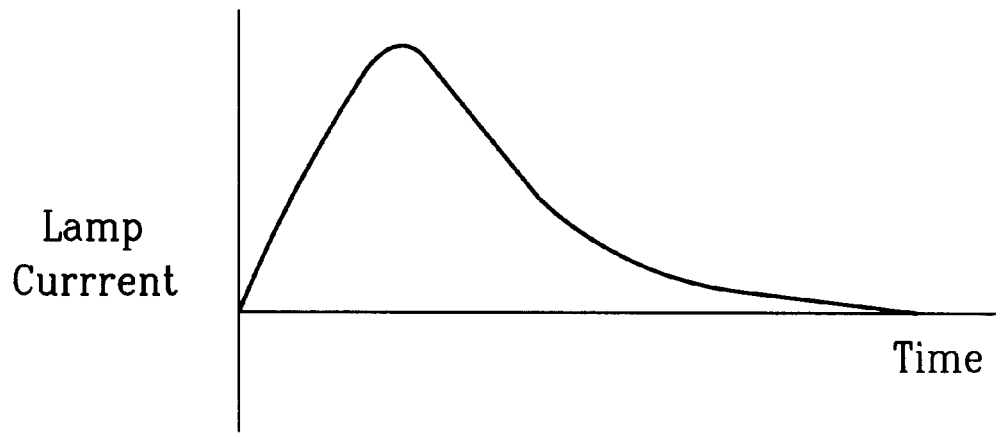
FIG. 3A is a graph showing the relationship between the lamp current and the time.
Figure 3B:
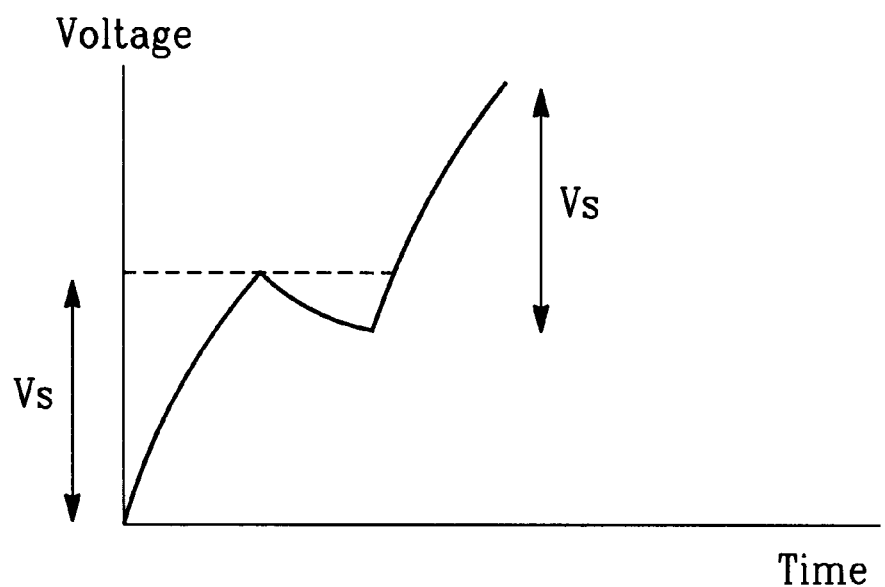
FIG. 3B is a graph showing the starting voltage of the switching element.

FIG. 1 is a circuit diagram totally showing the device for a discharge lamp according to one embodiment of the present invention, FIG. 2 is a graph showing the voltage-current characteristics of the switching element of the device for lighting a discharge lamp according to the present invention, and FIG. 3A is a graph showing the relationship between the lamp current and the time, and FIG. 3B is a graph showing the starting voltage of the switching element.

Construction of Circuit

As shown in FIG. 1, a device A for lighting a discharge lamp is composed of a commercially available power source 101, a rectifying circuit 102 which is connected to the power source 101, a switching circuit 103 which is connected to the rectifying circuit 102, a circuit 104 for supplying direct power which is connected to the switching circuit 103, a device 114 for detecting a current and voltage, which is connected to the circuit 104, a discharge lamp 108 which is connected to the device 114 via a diode 107, a second capacitor 110 which is connected to the discharge lamp 108 in parallel, a starter 106 which is connected to the circuit 104 for supplying direct power, and a series connecting circuit 131 comprising switching element 130 and a resistance 109 which is connected between the starter 106 and the discharge lamp 108.

The circuit 104 for supplying direct power is composed of a transformer 105, diodes 118b and 118a serving as a second rectifying circuit, which is connected to a secondary winding of the primary winding of the transformer 105, a choke coil 119 which is connected to the output sides of the diodes 118b and 118a, a smoothing capacitor 120 (filtering circuit) which is connected to the choke coil 119 in parallel.

The starter 106 connects to the resistance 106a and a diode AC switch (DIAC) 106c in series and is composed of a capacitor 106b which connects the resistance 106a and the DIAC 106c in parallel, a transformer 106d for generating a high voltage provided downstream of the DIAC 106c, a diode 106e provided downstream of the transformer 106d for generating a high voltage, and a smoothing capacitor 106 which connects to the diode 106f in parallel.

The winding ratio of the transformer 106d is set at a high value so as to be able to generate a voltage not less than twice the initial current-running of the switching element 130.

On the other hand, the series-connecting circuit 131 which connects the starter 106 and the discharge lamp 108 in series, and is composed of, from the discharge lamp 108 side, a resister 109, and a switching element 130 connected downstream of the resister 109. A trigger element such as a spark gap or DIAC is used in the switching element 130.

The working of the spark gap will now be described. When a voltage is applied between two electrodes of the spark gap and the voltage exceeds a prescribed level, the state is shifted from the insulating state to the state for initiating the discharge (generally exceeding approximately 1,000 V, see FIG. 2 (1)), starting the discharge (see FIG. 2 (2)), in which case, the voltage between the electrodes of the spark gap becomes as low as several tens volts (see FIG. 2 (3)). This state is the same state where current runs between the electrodes of the spark gap.

Procedure of Working Discharge Lamp

The procedure of working the discharge lamp 108 will now be described.

As shown in FIG. 1, when being connected to the commercially available power source 101, the electric power is converted into a direct power through the rectifying circuit 102. Subsequently, the direct current is converted into a high frequency electric power through a filtering circuit 103, and then output from diodes 118b and 118a, which are the transformer 105 and a second rectifying circuit, respectively.

On the other hand, a starter 106 gets powers from the diodes 118b and 118a, and generates a high frequency switching voltage by means of a relaxation oscillating circuit utilizing a trigger element to drive a transformer 106d having a high voltage rising ratio. The voltage output from the starter 106 is supplied to the discharge lamp 108 via the circuit 131 connecting the switching element 130 and the resistor 109 in series. At this time, to the circuit 104 for supplying a direct power which provides the diode 107, a high voltage from the starter 104 is never applied.

The circuit 131 which possesses the resistor 109 can be prevented from the generation of rapidly oscillating current, since momentary current running from the smoothing capacitor 106f toward the discharge lamp 108 can be suppressed.

The second capacitor 101 connected to the discharge lamp 108, which tends to the situation where current is easily run, in parallel, can suppress the rapid change in voltage of the discharge lamp 108. This is due to the fact that when the switching element 130 is charged, the smoothing capacitor 106f and the second capacitor are connected in parallel, at the time which the electric charge deposited on the smoothing capacitor 106f before the switching element 130 is charged is divided both in the smoothing capacitor 106f and the second capacitor 110, leading to the suppression of a decrease in the voltage loaded on the discharge lamp 108. Consequently, as soon as the switching element 130 is charged, the charge of the smoothing capacitor 106f is gently run through the discharge lamp 108. As shown in FIG. 3A, the lamp current of the discharge lamp 108 can be supplied in the state suitable for maintaining the discharge.

Showing the FIG. 3A from the smoothing capacitor 106f to the discharge lamp 108, the switching element 130 and the second smoothing capacitor are connected in series. For this reason, the voltage for running the current to the switching element 130 again is a voltage that in addition to the voltage applied to the second capacitor 110, the voltage for initiating the running of the current to the switching element 130 is added (see FIG. 3B). Consequently, since the discharge lamp 108 is applied to a high voltage as high as the voltage applied to the second capacitor 110, the discharge lamp 108 easily brings about the dielectric breakdown, and there is a tendency to be shifted into the arc discharge.

In conventional, in the case where the discharge lamp is lightened again, it is required to be stood by until the temperature of the sealed gas is decreased enough. However, in the present invention, the discharge lamp 108 can easily be lightened again even if the temperature of the sealed gas in the discharge lamp 108 is not decreased enough.

When the capacity of the second capacitor 110 is smaller than that of the smoothing capacitor 106f, the following preferred effects can be obtained:

In the case where even if a current is run to the switching element 130, no dielectric breakdown is brought about, the charge which has been deposited on the smoothing capacitor 106f before the current is run to the switching element 130, is divided both into the smoothing capacitor 106f and the second capacitor 110. At this time, if the value of the second capacitor 110 is small, the decrease in the voltage is small as such and, thus, the voltage of the second capacitor 110 is adjusted to the level close to that of the smoothing capacitor 120. For example, if the capacity of the second capacitor 110 is equal to that of the smoothing capacitor 120, the decrease in voltage become the value half the voltage before the decrease. In contrast, if the capacity of the second capacitor 110 is 1/10 that of the smoothing capacitor 120, the decrease in the voltage is as low as 1/10 the voltage before decreasing. Consequently, in the later case, much more high voltage can be applied to the discharge lamp 108 to ensure the dielectric breakdown.

(2) Second Embodiment

The second embodiment of the present invention will now be described by referring to the drawings.

Figure 4:
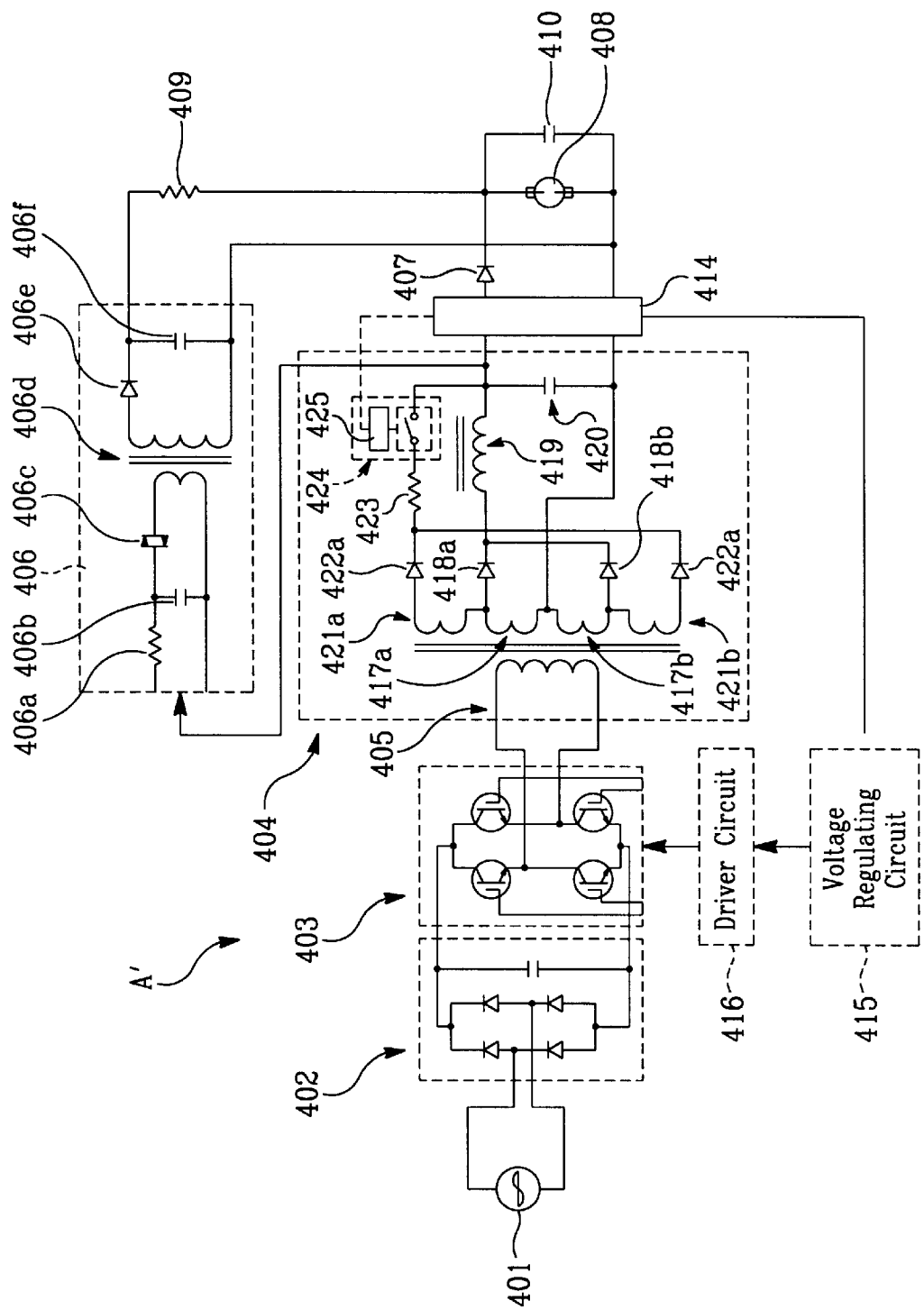
FIG. 4 is a circuit diagram totally showing the device for a discharge lamp according to another embodiment of the present invention.
Figure 5:
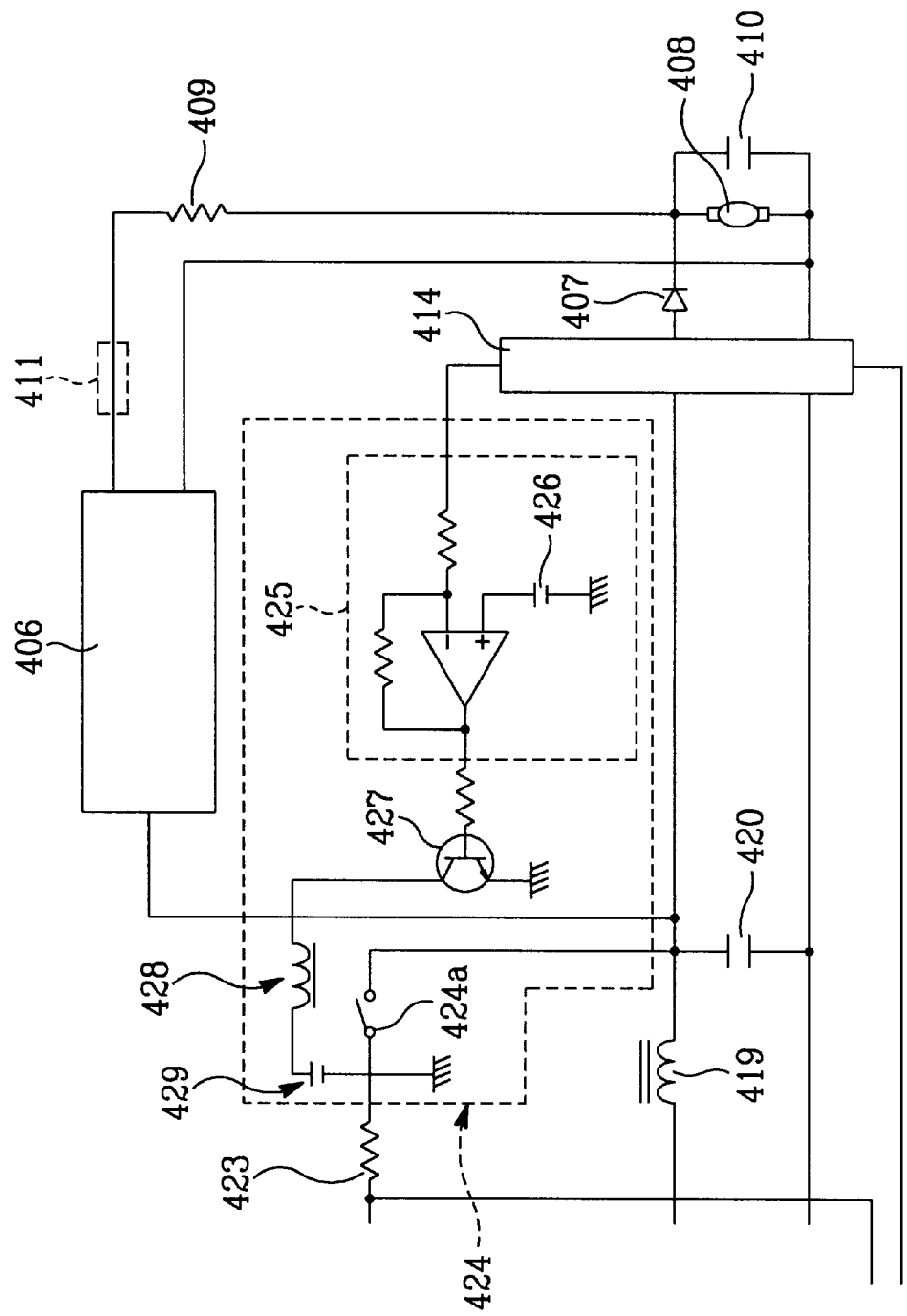
FIG. 5 is a circuit diagram showing the main portion of the switching circuit of the present invention.
Figure 6:
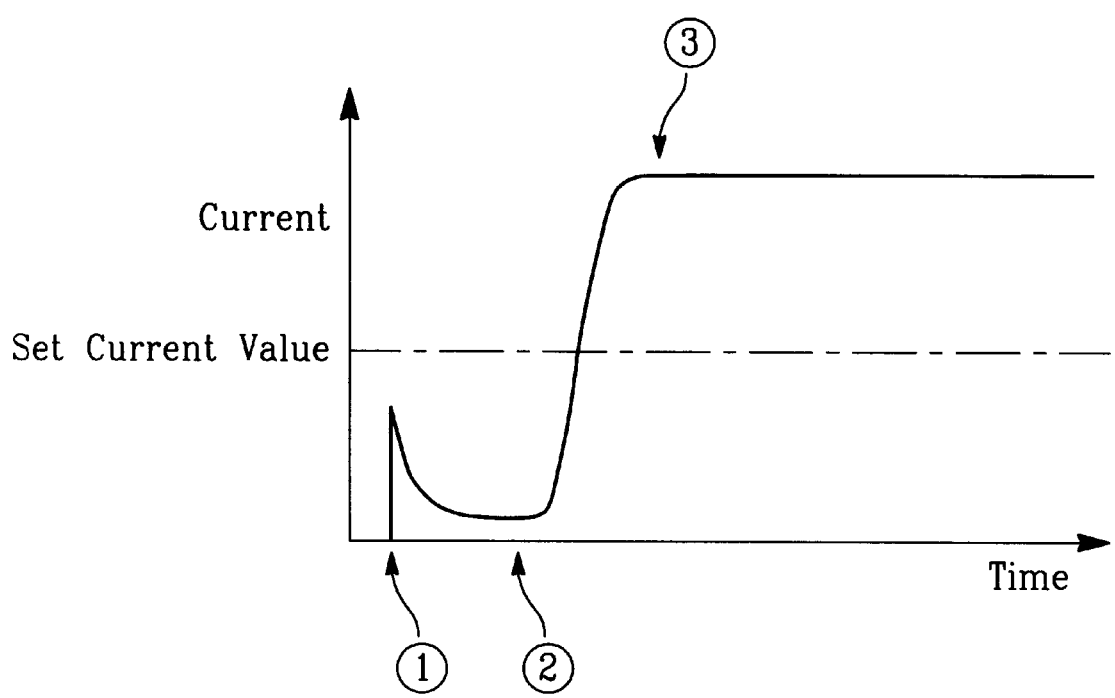
FIG. 6 is a graph showing the change in current with the elapse of time and showing a set value of the current.
Figure 7A:
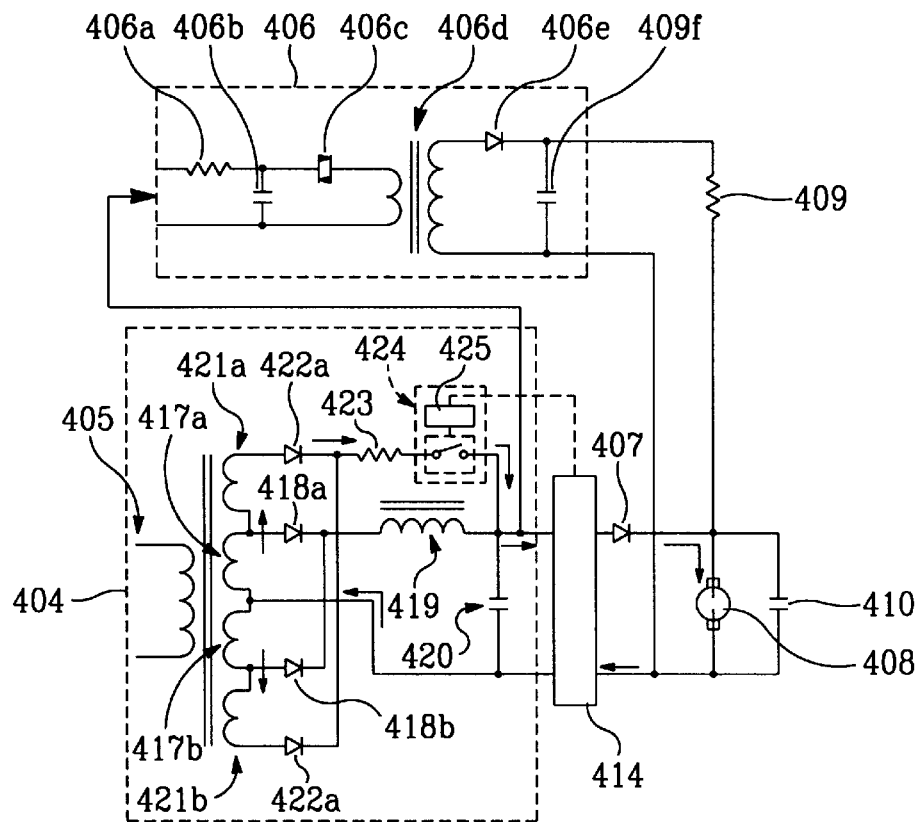
FIG. 7A and FIG. 7B each shows a circuit showing the current in the switching circuit of the present invention.
Figure 7B:
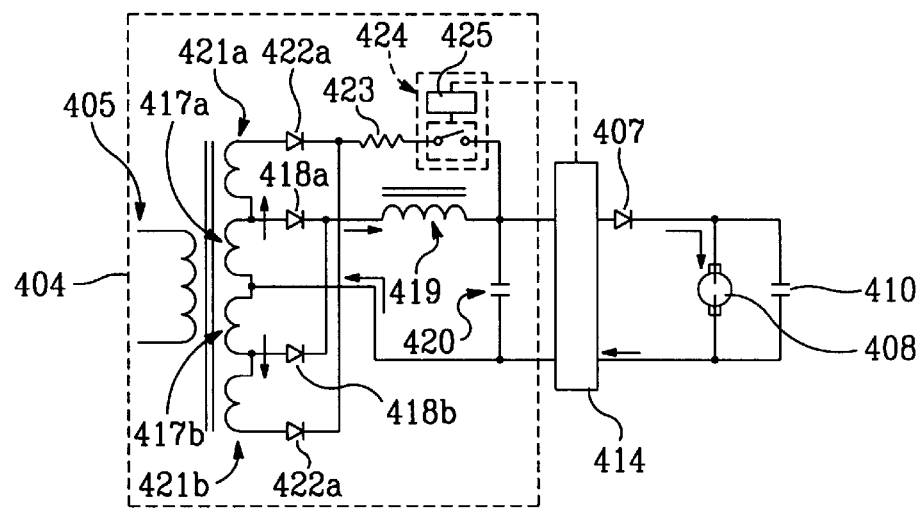
Figure 8:
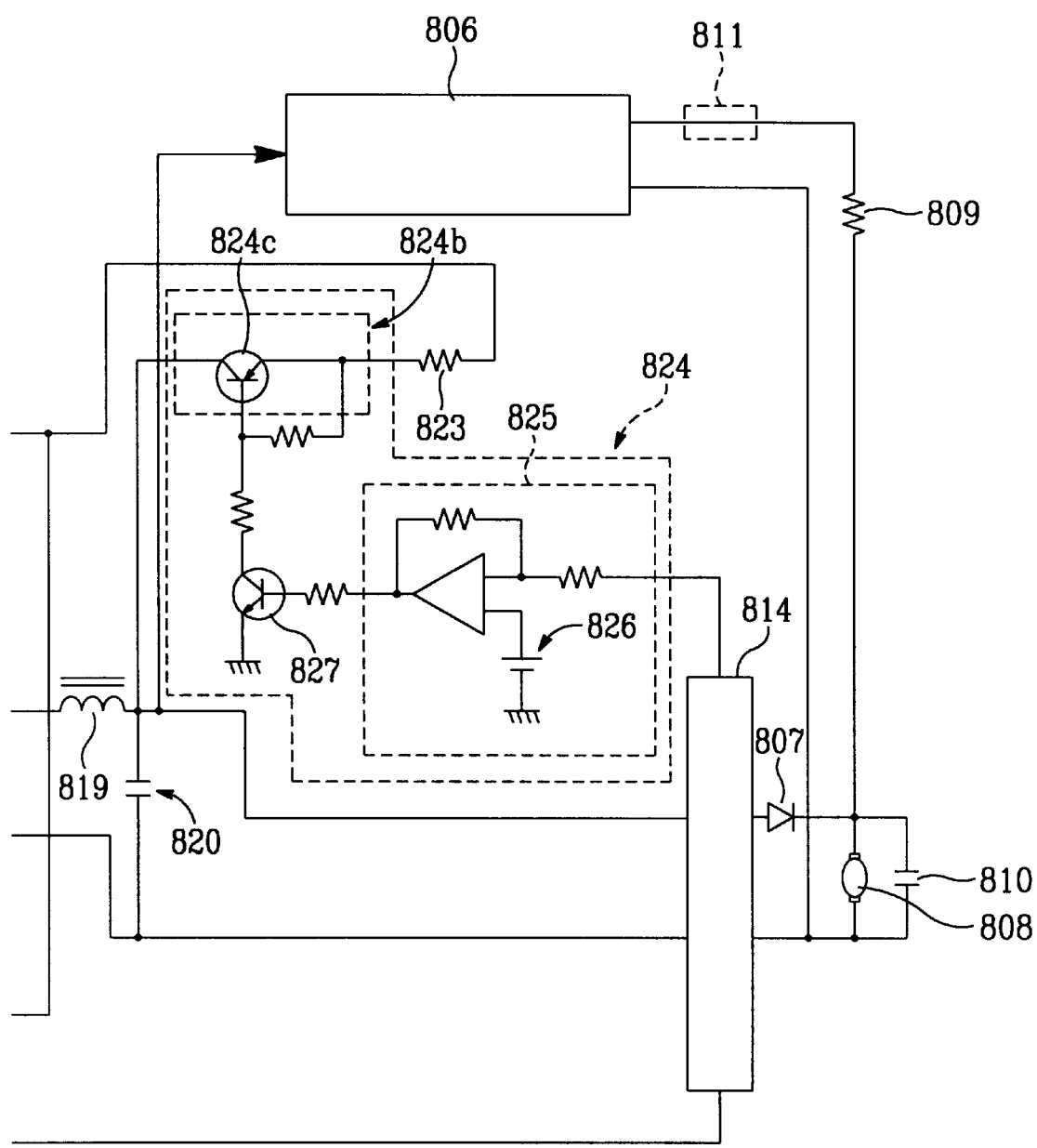
FIG. 8 shows a circuit diagram illustrating the main portion another embodiment of the switching circuit used according to the present invention.
Figure 9A:
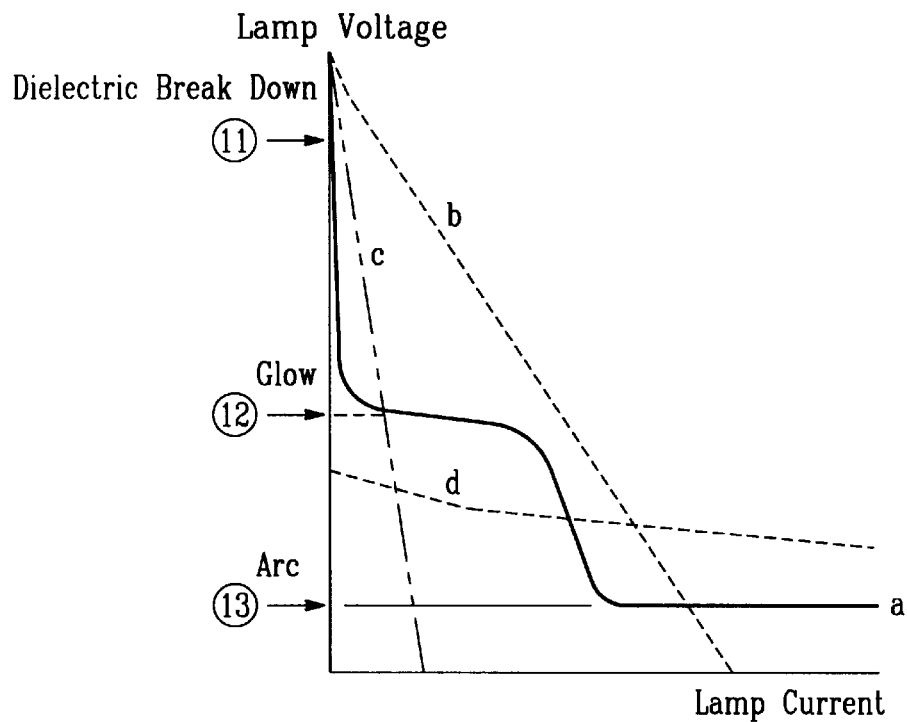
FIG. 9A is a graph showing the relation between the current and the voltage of the conventional starter and FIG. 9B is a graph a graph showing the relation between the current and the voltage of the conventional discharge lamp.
Figure 9B:
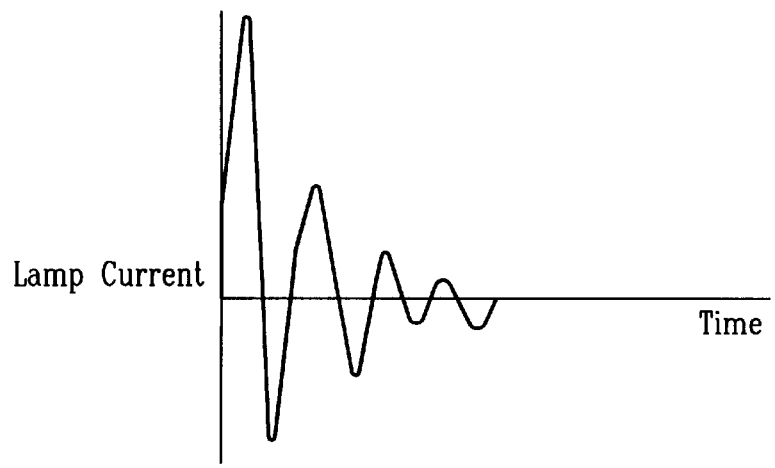

FIG. 4 is a circuit diagram totally showing the device for a discharge lamp according to another embodiment of the present invention; FIG. 5 is a circuit diagram showing the main portion of the switching circuit of the present invention; FIG. 6 is a graph showing the change in current with the elapse of time and showing a set value of the current; FIG. 7A and FIG. 7B each shows a circuit showing the current in the switching circuit of the present invention; FIG. 8 shows a circuit diagram illustrating the main portion of another embodiment of the switching circuit used according to the present invention.

The explanation described in the first embodiment of the present invention will be omitted.

Construction of Circuit

As shown in FIG. 4, the device A' for lighting a discharge lamp is composed of a power source 401 which is generally commercially available type, a rectifying circuit 402 connected to the power source 401, a switching circuit 403 connected to the rectifying circuit 402, a circuit 404 for being converted into direct power connected to the switching circuit 403, a detector 414 for detecting a current and a voltage connected to the converter circuit 404, a discharge lamp 408 connected to the detector 414 via a diode 407, a capacitor 410 connected to the discharge lamp 408 in parallel, a switching circuit 424 for starting provided on the circuit 404 for being converted into direct power, a starter 406 which works via the switching circuit 424 for starting, and a resistor 409 provided between the starter 406 and the discharge lamp 408 in series.

The signal detected from the detector 414 is transmitted to the switching circuit 403 via a circuit 415 for controlling a power and a driver circuit 416 which works by a signal from the circuit 415 for controlling a power.

The converter switching circuit 404, a detector 414 for detecting a current and a voltage possesses a transformer 405, secondary windings 417a and 417b of the primary winding of the transformer 405, second auxiliary windings 421a and 421b of the secondary windings 417a and 417b, diodes 418a and 418b, and diodes 422a and 422b each provided on the secondary windings 417a and 417b and the second auxiliary windings 421a and 421b (to make a rectifying circuit), a switching circuit 424 for starting connected to the diodes 422a and 422b via a resistor 423, a choke coil 419 connected to the diodes 418a and 418b, and a smoothing capacitor 420 connected to the choke coil 419 in parallel.

The starter 406 is connected to a resistor 406a and a DIAC 406c in series and, at the same time, is composed of a capacitor 406b connected to the resistor 406a and the DIAC 406c in parallel, a transformer 406d provided downstream of the DIAC 406c, a diode 406e connected downstream of the transformer 406d, and a capacitor 406f connected to the diode 406e in parallel.

In the starter 406 shown in FIG. 5 and FIG. 8, the initial resistance becomes higher in the case of running a current and, thus, when the working for starting the discharge lamp is made, the voltage is then lowered to open switch portions 424a and 424b to thereby be stopped.

On the other hand, as shown in FIG. 5, the switching circuit 424 for starting is composed of a circuit 425 for discriminating a discharge, a transistor 427 provided on the output side of the circuit 425 for discriminating a discharge via a resistance, a relay coil 428 connected to the transistor 427, a power source 429 connected to the relay coil 428, one end of the power source 429 being grounded. A power source 426 is connected to the non-inversion input side of the comparator of the circuit 425 for discriminating a discharge, and the output terminal of the detector 414 for detecting a current and a voltage is connected to the inversion input side of the comparator of the circuit 425. Opposite to the relay coil 428 is provided a switch portion 424a, which controls open or close in communication with driving or stopping the relay coil 428.

The circuit 425 for discriminating a discharge state, i.e., whether it is in a glow discharge or an arc discharge to control the switch portion 424a will now be described.

The power source generates a standard voltage for discriminating a discharge state, i.e., whether it is in a glow discharge or an arc discharge. The circuit 425 discriminates the discharge state based on the difference of the voltage from the standard voltage to control the switch portion 424a. As shown in FIG. 6, the standard voltage is calculated from the relational expression of current and voltage each for generating the dielectric breakdown of the sealed gas within the discharge lamp 408, the glow discharge and the arc discharge, and from the set value which has been set in each state (value of voltage calculated as current).

To be specific, the current in the glow discharge detected input from the detector has a small value (that is, higher than the standard voltage) and, thus the output voltage of the circuit 425 is high. Consequently, transistor 427 is turned on to start the relay coil 428 to close the switch portion 424a. When the current becomes large over the standard current value (that is, lower than the standard voltage) in the arc discharge, the output voltage of the circuit 425 is low to turn the transistor 427 off. As a result, the current of the relay coil 428 is broken to open the switch portion 424a.

Operation of Discharge Lamp

The operation of the discharge lamp 408 will now be described.

As shown in FIG. 7A, when the power source 401 (see FIG. 4), the power is converted into direct power by means of the rectifying circuit 402. The direct power is then converted into a high frequency power by means of the switching circuit 403. Consequently, the switching circuit 424 for starting works to supply a high voltage from the starter 406 to the discharge lamp 408 to generate a dielectric breakdown and, at the same time, to generate a glow discharge. At this time, the voltages at the sides of the second auxiliary windings 421a and 421b are in the state lower than the voltage at the starter 406 side. Running the current in the glow stage lowers the voltage of the starter 406 due to the high internal resistance whereby the starter 406 is substantially stopped. Consequently, unnecessary current does not run to the resistance 409, meaning the prevention of the loss due to heat of the direct resistance. For this reason, the heat loss generated in the resistance can be prevented.

As shown in FIG. 7A, when the voltage of the starter 406 is lowered, the total voltage from the second auxiliary windings 421a and 421b is in the state higher than the voltage of the starter 406 side. In this case, the voltage (a high voltage for discharge) is additionally supplied to the discharge lamp 408 from the second auxiliary windings 421a and 421b via the diodes 422a and 422b through the circuit separate from the starter 406. Due to the existence of the second auxiliary windings 421a and 421b, the voltages at the second auxiliary windings 421a and 421b sides are as high as approximately twice the voltage of the main power circuit, leading to reverse bias. In this case, the current from the secondary winding residing at the side of the main power circuit does not run. The current runs in the direction shown by the arrow in FIG. 7A.

As shown in FIG. 7B, when the discharge lamp 408 starts the discharge due to the arc discharge being shifted from the glow discharge, the voltage between the electrodes of the discharge lamp 408 is lowered to generate the current due to the arc discharge. The arc current causes the switching circuit 424 for starting to be in the open state by means of the detector 414 for detecting a current and voltage and the circuit 425 for discriminating discharge to break the supplying of the power from the second auxiliary windings 421a and 421b. For this reason, at the side of the main power circuit, the bias becomes in the normal state. In this case, the current is supplied from the secondary windings 417a and 417b to the discharge lamp 408 in the direction shown as the arrow. Thereafter, the discharge lamp 408 is lightened in the steady state by means of the direct power from the secondary windings 417a and 417b residing in the main power circuit.

Consequently, since unnecessary current runs to the resistance 423, the heat loss due to heating of the direct resistance can be prevented.

According to the second embodiment of the present invention, the switching circuit for starting may be constructed as shown in FIG. 8. To be specific, the switching circuit 824 starting is composed of a circuit 825 for discriminating discharge, a transistor 827 provided on the output side of the circuit 825 for discriminating discharge via a resistor, and a PNP transistor 824c serving as a switch portion connected to the transistor via the transistor 827. A power source 826 is connected to the non-inversion input side of the comparator of the circuit 425 for discriminating a discharge, and the output terminal of the detector 814 for detecting a current and a voltage is connected to the inversion input side of the comparator of the circuit 825.

Consequently, when the output voltage of the circuit 825 for discriminating discharge which is in the glow discharge state, the transistor 827 becomes an on-state. At this time, since the PNP transistor 824c becomes an on-state, the switch portion 824b is on state accordingly, corresponding to the state that the connecting point of the relay coil 428 is closed described above (see FIG. 5). When the circuit 825 for discriminating discharge is turned off in the arc discharge state, the transistor 827 becomes an off-state accordingly. The base current of the PNP transistor 824c is broken to turn the switch portion 824b off, corresponding to the state that the connecting point of the relay coil 428 is opened described above (see FIG. 5). For this reason, the circuit 825 for discriminating discharge has effects similar to those of the circuit 425 for discriminating discharge.

In a preferred embodiment of FIG. 5 or FIG. 8, in order to ensure the stopping of the starter 406, a switching element 411 or 811 as shown as an imaginary line in FIG. 5 or FIG. 8 is connected to the resistor 409 or 809 in series to make a series-connecting circuit, which is provided between the starter 406 or 806 and the discharge lamp 408 or 808. When the switching element 411 or 811 is provided, the working of the starter 406 or 806 and the stopping of the switching element 411 or 811 are ensured when the voltage of the starter 406 or 408 is lowered. For this reason, the dielectric breakdown, the glow discharge and the shift into the arc discharge of the discharge lamp 408 or 808 can be ensured.

The additional output voltage and additional output current from the second auxiliary windings 421a and 421b have the characteristics required for shifting the glow discharge state into the arc discharge state. For this reason, it is only required the second auxiliary windings 421a and 421b run a current only in an amount sufficient for initiating the arc discharge and, thus, the capacity thereof can be smaller than that of the secondary windings 417a and 417b (main current winding).

The present invention having the construction described above has the following outstanding advantages:

(1) In the device for lighting a discharge lamp according to the present invention which has a series-connecting circuit comprising a switching element and a transformer, when a discharge lamp is lightened, rapid change in the voltage and the current can be reduced to control the generation of a noise. This prevents unstable working due to the generation of a noise having an influence upon the power circuit at initiating the discharge.

(2) In the device for lighting a discharge lamp according to the present invention in which a second capacitor is connected to the discharge lamp in parallel, a switching element provided between the starter and the discharge lamp, and the switching element can supply an additional high voltage from the main power circuit side to the discharge lamp, it becomes possible to apply a voltage higher than the voltage for initiating the discharge to the discharge lamp, making it possible to ensure the dielectric breakdown of the sealed gas within the discharge lamp. For this reason, the device for lighting a discharge lamp according to the present invention can rapidly lighten the discharge lamp again even if the temperature of the sealed gas within the discharge lamp is not decreased enough.

The parallel connection of the second capacitor to the discharge lamp can absorb a rapid change in the voltage generated on the discharge lamp.

There is not need for supplying an unnecessarily high current to the discharge lamp to the discharge lamp, making the service life of the discharge lamp much longer.

(3) In the device for lighting a discharge lamp according to the present invention in which in which the capacity of the second capacitor is smaller than that of the smoothing capacitor, in the case where no dielectric breakdown is brought about even if a high voltage is applied to the discharge lamp, the voltage of the second capacitor is adjusted to a level near the voltage of the smoothing capacitor. For this reason, voltage drop applied to the discharge lamp can be avoided and, at the same time, the second capacitor can apply to the discharge lamp a voltage higher than the voltage from the smoothing capacitor for initiating the discharge. This allows to cause the dielectric breakdown with ease, making it possible to easily lighten the discharge lamp again.

(4) In the device for lighting a discharge lamp according to the present invention in which second auxiliary windings are provided at the side of the secondary winding of the main power circuit, since much higher voltage can be supplied to the discharge lamp from the main power circuit side at the time of shifting the glow discharge into the arc discharge via a switching circuit for starting, a heat loss due to heating the direct resistance can be prevented. It becomes unnecessary to supply a unduly high current to the discharge lamp, making it possible to extent the service life of the discharge lamp.

(5) In the device for lighting a discharge lamp according to the present invention in which a switching element is connected to the resister in series to make a series-connecting circuit, which is provided between the starter and the discharge lamp. When the switching element is provided, the working of the starter and the stopping of the switching element are ensured when the voltage of the starter is lowered. For this reason, the dielectric breakdown, the glow discharge and the shift into the arch discharge of the discharge lamp can be ensured.

(6) In the switching circuit for starting in the device for lighting a discharge lamp according to the present invention, a current-voltage detecting circuit connected to a circuit for discriminating discharge can exactly be operated the direct voltage from the main power circuit and the direct voltage from secondary winding can be appropriately supplied to the discharge lamp depending upon the situation of working the discharge lamp. The operation of the discharge lamp can be carried out smoothly.

(7) In the device for lighting a discharge lamp according to the present invention having a simplified construction and capable of exactly lighting a discharge lamp, a light-weight, small-sized device can be provided.

While the invention has been described in detail and with reference to specific embodiments thereof, it will be apparent to one skilled in the art that various changes and modifications can be made therein without departing from the spirit and scope thereof.

What is claimed is:

1. A device for lighting a discharge lamp comprising a rectifier, a switching circuit having a semiconductor element to be connected to said rectifier; a direct power supplying circuit having a rectifying circuit and a filtering circuit each connected to said switching circuit; and a discharge lamp and a starter which are connected after said filtering circuit;

said starter having a transformer and a smoothing capacitor for generating a high voltage; and said device having a circuit having a switching element and a resistance connected in series provided between the smoothing capacitor and said discharge lamp, and further having a second capacitor connected parallel to said discharge lamp to suppress a transient vibration due to pulse applied to the discharge lamp.

2. The device for lighting a discharge lamp as claimed in claim 1, wherein said switching element supplies a voltage to said discharge lamp in such a manner that the voltage set until conditions for causing the dielectric break down of the sealed gas of the discharge lamp are ready.

3. The device for lighting a discharge lamp as claimed in claim 1, wherein said second capacitor has a capacity smaller than that of said smoothing capacitor.

4. A device for lighting a discharge lamp comprising a switching circuit having a semiconductor, a transformer connected to said switching circuit, a rectifying circuit connected to said transformer, a filtering circuit connected to said rectifying circuit, a discharge lamp connected after the rectifying circuit and a starter for starting said discharge lamp; said transformer having a primary winding for supplying main current to a secondary winding and at the same time having second auxiliary windings, and supplying a direct current voltage obtainable from the rectifying circuit connected to said second auxiliary windings to a main voltage supplying circuit via a starting switching circuit until the discharge lamp is stably lightened.

5. The device for lighting a discharge lamp as claimed in claim 4, wherein said starter possesses a smoothing capacitor for generating a high voltage, and a circuit having a switching element and a resistor connected in series, a second capacitor is conductive at a voltage higher than a predetermined level, and said starter is connected to said discharge lamp in parallel.

6. The device for lighting a discharge lamp as claimed in claim 4, wherein said starting switching circuit possesses a circuit for discriminating discharge, one end of which circuit is connected to a current-voltage detecting circuit and, at the same time, a working portion which decides "ON" or "OFF" of said starting switching circuit, according to the output from said circuit for discriminating discharge.

7. A process for lighting a discharge lamp comprising:

supplying to a discharge lamp, a high voltage for dielectric breakdown from a starter and, at same time, another high voltage for dielectric breakdown, which is lower than the former voltage, from auxiliary windings provided on a transformer to cause dielectric breakdown to thereby cause a glow discharge between the electrode of the discharge lamp, whereby a current runs between the electrodes to stop the starter, and when the conditions of arc discharge are satisfied and the amount of the current becomes more than a prescribed set value, supplying a current from a main power circuit to the discharge lamp to lighten the discharge lamp, the process further comprising the following step: supplying, after stopping the starter, an additional high voltage for discharge from said auxiliary windings to shift the glow discharge into the arc discharge, and then breaking the voltage therefrom.

* * * * *